United States Patent [19]

Gregory

[11] Patent Number: 4,942,743
[45] Date of Patent: Jul. 24, 1990

[54] HOT GAS DEFROST SYSTEM FOR REFRIGERATION SYSTEMS

[76] Inventor: Charles Gregory, 1348 #5 Highway, Burlington, Ontario, Canada, L7R 3X4

[21] Appl. No.: 268,412

[22] Filed: Nov. 8, 1988

[51] Int. Cl.⁵ .............................................. F25B 43/00
[52] U.S. Cl. ......................................... 62/503; 62/513
[58] Field of Search ............................ 62/503, 513, 83

[56] References Cited

U.S. PATENT DOCUMENTS

| | | | |
|---|---|---|---|
| 2,577,598 | 12/1951 | Zwickl | 62/503 X |
| 3,060,704 | 10/1962 | Miller | 62/503 |
| 3,163,998 | 1/1965 | Wele et al. | 62/503 X |
| 3,765,192 | 10/1973 | Root | 62/503 X |
| 3,955,375 | 5/1976 | Schumacher | 62/503 X |
| 4,217,765 | 8/1980 | Ecker | 62/503 |
| 4,537,045 | 8/1985 | Mayer | 62/503 |
| 4,683,726 | 8/1987 | Barron | 62/503 |
| 4,809,520 | 3/1989 | Manz et al. | 62/513 X |

Primary Examiner—William E. Tapolcai
Attorney, Agent, or Firm—Rogers & Scott

[57] ABSTRACT

The invention provides a full flow vaporizing accumulator for use in a refrigeration system employing hot gas from the compressor to periodically defrost the cooling coil, or coils where multiple coils are employed. The hot gas cooled in the defrosting coil produces liquid refrigerant droplets that may damage the expensive compressor. The device replaces the usual accumulator that is always provided to try to ensure that these droplets do not reach the compressor. The interior of the vaporizing accumulator is divided by a partition into two chambers, one of which the cooled gas from the defrosting coil is delivered via a perforated tube having one end blocked, so that the fluid is directed forcefully radially outward to make it turbulent. The interiors of the two chambers are connected by a plurality of fine bores in the partition, which discharge the turbulent fluid into intimate contact with a coil heated by the hot gas that is fed thereto before it is fed to the cooling coil to defrost it. The outlet from the second chamber consists of the usual J-shaped accumulator outlet tube having a drain hold at its lowest point. An orifice or restriction is provided at the outlet for the hot gas from the heated coil and increases the back-pressure applied to the compressor by an amount of between 20% and 70%, preferably by between 40% and 60%, rendering the device self-balancing to prevent compressor overload.

43 Claims, 3 Drawing Sheets

HOT GAS DEFROST SYSTEM FOR REFRIGERATION SYSTEMS

FIELD OF THE INVENTION

This invention is concerned with improvements in or relating to refrigeration systems, and especially to hot gas defrost systems for refrigeration systems and to apparatus for use in such hot gas defrost systems.

REVIEW OF THE PRIOR ART

The cooling coil of any refrigeration system will gradually collect frost or ice on its surface, due to the fact that water vapour in the air in contact with the coil condenses on it, and its temperature is usually low enough for the moisture to freeze on it. Ice is a relatively good heat insulator and if allowed to build up will initially lower the efficiency of the refrigerator, and eventually cause it to become ineffective. The situation is more extreme in large commercial installations in which the ambient air is force circulated over the cooling coil or coils by a fan, because of the larger volumes of air which contact the coil.

It is standard practice therefore in all but the simplest refrigerator or refrigerator installation to provide a system for automatically defrosting the coil, usually by arranging that at controlled intervals it is warmed to a temperature and for a period that will melt the ice, the resultant water being drained away. There are two principal methods currently in use for automatic defrost, namely electrical and hot gas.

In an electrical defrost system electric heating elements are provided in contact with the coil; at the required intervals the refrigeration system is stopped from operating and the elements are switched on to provide the necessary heat. In a hot gas defrost system the hot gas delivered from the compressor, that normally goes to an exterior coil to be cooled, is instead diverted into the cooling coil, again for a predetermined period found from experience to be satisfactory for the purpose. Both systems have their advantages and disadvantages.

An electrical system is relatively easy to design and install, but is more costly to implement and much less energy efficient than a hot gas system. A hot gas system is less costly to install but has been difficult to design; a particular problem of such systems is that the compressor, the most expensive single component of the system, is easily damaged if it receives liquid refrigerant instead of gaseous refrigerant at its inlet. The heat exchange between the hot gas and the cold ice-laden coil will tend to liquefy the refrigerant, and the resultant droplets are difficult to remove from the gas, with consequent danger to the compressor. A hot gas system delivers the heat directly to the tube of the coil and can therefore perform a comparable defrost with less energy expenditure than an equivalent electrical system. Moreover, the hot gas system effectively obtains its power from the compressor motor and requires oly the addition of suitable flow valves and piping for its implementation; it is therefore the preferred system provided one is able to ensure that the expensive compressor is not damaged by the entry of liquid refrigerant.

Another problem with hot gas systems is the difficulty that the defrosting cools the circulating vapour to produce some liquid, reducing the quantity available to the compressor to keep it operating efficiently. In commercial installations the usual solution is to employ multiple evaporator coils and to defrost them one at a time, so that the other coils can maintain the vapour supply at a suitable level. This requires somewhat complex valving to achieve.

It is conventional practice to employ at least three separate coils, since it is considered that there is too much danger with only two coils of "running out of heat", so that the compressor does not receive sufficient vapour to operate. Some commercial installations use even more than three coils to ensure that this type of failure cannot happen, but this increases the overall complexity of the system and also increases the number of defrost periods required, so that it becomes difficult to schedule the defrost outside the peak shopping periods. There is a tendency in commercial supermarket practice to revert to small multiple installations in place of large central units, and these become expensive if multiple coils are required for defrost purposes, while electrical defrost is relatively expensive in operation for commercial purposes, although acceptable for domestic refrigerators for want of a more efficient system. There has been reluctance to apply hot gas defrost to a single coil refrigerator because of the difficulty of avoiding running out of vapour, or the alternative difficulty if the fluid from the evaporator coil is heated, for example by a heat exchanger, of ensuring that the compressor does not become overheated because of the too hot gas fed to its inlet.

One special group of systems in which defrost is a particular problem are those used on smaller transport trucks, since they must be able to operate alternatively from the truck engine while it is travelling, and from an electric plug-in point while stationary in the garage with the engine stopped. A hot gas defrost would be most satisfactory, but requires a complex reverse cycle and the majority of systems opt for an electric defrost while plugged in, the icing that occurs during running being accepted as unavoidable.

As an example of the energy required to operate an electrical defrost system in a commercial "cold room" intended for the storage of frozen meat at about $-23°$ C ($-10°$ F), a system employing a motor of 5 horsepower requires electric hearing elements totalling 6,000 watts to satisfactorily defrost the coil, employing a heating cycle of four periods per day, each of 45 minutes duration. The daily consumption of defrost energy is therefore 18 kWH. This heat is injected into the room and must subsequently be removed by the system, adding to the cost of operation. The transfer of heat from the electric elements to the coil is not very efficient and in many systems it is found that during the defrost period the temperature in the cooled space rises from the nominal value to as high as $0°$ C ($32°$ F, and this is high enough to cause thermal shock to some products, such as ice cream. Moreover, unsophisticated users of the system may be disturbed to find during a defrost period that the "cold" room is unexpectedly warm and conclude that the system is faulty, leading to an unnecessary service call.

Another type of apparatus incorporating a refrigeration system is a heat pump, as used for space heating and cooling in domestic housing and commercial establishments. It is usual practice with such systems for the outdoor coil to be air-cooled, owing to the expense of a ground-cooled system, and periodic defrosting of the outdoor coil is necessary when the system is in heating mode, because of the tendency of the coil to become ice-laden, especially when the outside temperature is low and the system is working at full capacity. "Reverse cycle" defrosting is by far the most common method of defrost employed, and in this method the unit is switched to the cooling mode and defrost occurs as hot gas from the compressor condenses in the outdoor coil. During defrost, the outdoor fan is usually de-energized because it would work against the defrosting process. This method requires the use of auxiliary resistance heaters because during defrost the unit is trying to cool the space, and the auxiliary heat must be activated to temper the cool supply air. Thus, it is a common complaint with such systems that it is blowing cold air, and periodically the rooms that should be heated are instead cooled to the point of some discomfort. Ideally, the number of defrost cycles should be held to a minimum because the compressor is subjected to wear and strain every time defrost is initiated and experience has shown that damage occurs to the compressor due to sudden pressure changes as the cycle is reversed and liquid refrigerant entering the compressor. These systems are of course required to be as inexpensive as possible, so that single coils are used, and the difficulty described above of applying hot gas defrost to single coils has hitherto prevented its adoption, although a safe rapid hot gas defrost system would be of particular advantage with such systems.

It is standard practice in refrigeration systems to install a liquid accumulator in the suction line just ahead of the compressor intake in order to trap any liquid in the line and ensure that it does not reach the compressor and damage it. The present invention provides such a suction line accumulator that is also able to function as a liquid refrigerant vaporizer.

DEFINITION OF THE INVENTION

It is therefore an object of the present invention to provide a new liquid refrigerant vaporizing accumulator for use in a hot gas defrost system of a refrigeration system.

It is also an object to provide a new hot gas defrost system for use in refrigeration heat pump systems.

In accordance with the present invention there is provided a liquid refrigerant vaporizing accumulator for use in a refrigeration system employing hot refrigerant fluid to defrost a coil or coils thereof, the vaporizing accumulator comprising:

a body member;

a partition member within the interior of the body member and dividing the interior into first and second chambers;

an inlet to the first chamber for connection into the refrigeration system so as to receive refrigerant fluid exiting from the coil under defrost;

a plurality of bores in the partition connecting the interiors of the two chambers for the passage of refrigerant fluid from the first chamber to the second chamber;

a heat exchange pipe of heat conductive material disposed in the second chamber adjacent the said plurality of bores for its surface to be impinged by the refrigerant fluid passing through the bores for vaporization of liquid entrained therein;

an inlet to the pipe and an outlet therefrom for connection into the refrigeration system to receive and to deliver respectively hot refrigerant fluid received from the compressor; and an outlet from the second chamber connected to an accumulator outlet pipe within the second chamber.

A hot refrigerant fluid defrost system of the invention for use in a refrigeration system for defrost of a coil or coils thereof comprises:

a controllable flow valve adapted for connection to the outlet of a compressor pump to receive hot compressed refrigerant fluid therefrom;

a coil to be defrosted having an inlet and an outlet; and a vaporizing accumulator as specified in the preceding paragraph connected to the coil for vaporizing liquid fluid issuing from the coil outlet to prevent its delivery to the compressor inlet.

A refrigeration system embodying the invention comprises:

a refrigerant compressor;

a cooling coil having an inlet and an outlet;

an expansion device for expanding and cooling refrigerant connected between the compressor and the cooling coil inlet;

a controllable defrost control valve connected to the compressor outlet to receive hot compressed refrigerant fluid therefrom;

and a liquid refrigerant vaporizing accumulator as specified above connected to the coil for vaporizing liquid fluid issuing from the coil outlet to prevent its delivery to the compressor inlet.

DESCRIPTION OF THE DRAWINGS

Embodiments of the invention will now be described, by way of example, with reference to the accompanying schematic and diagrammatic drawings, wherein.

The same references are used in all the figures of the drawings wherever that is possible.

DESCRIPTION OF THE PREFERRED EMBODIMENTS

Figure 1:
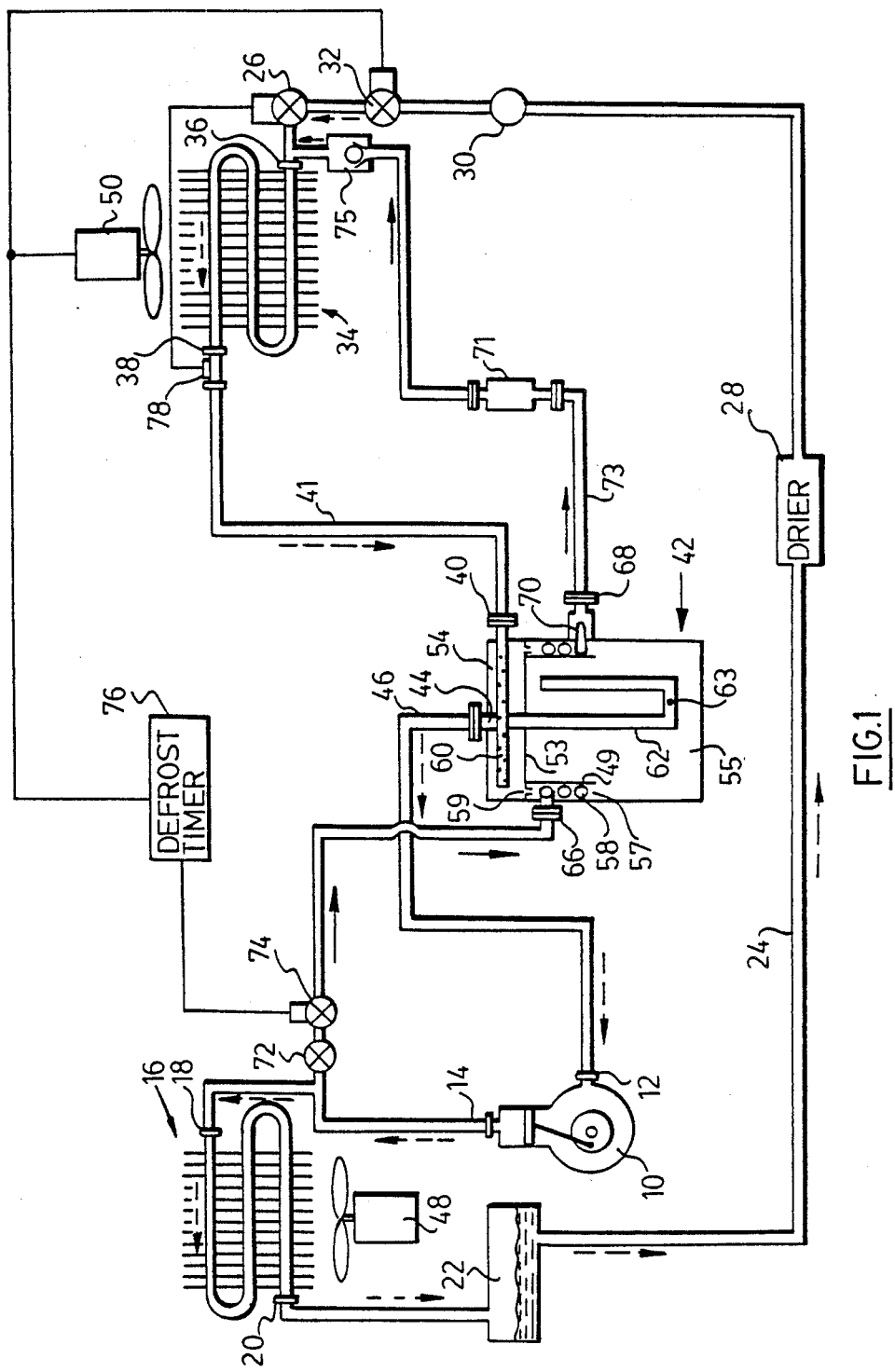
FIG. 1 is a schematic diagram of a refrigeration system embodying the invention.

FIG. 1 shows a refrigeration system which includes a compressor 10 having a suction inlet 12 and a high pressure outlet 14. A refrigerant condenser coil 16 has an inlet 18 connected to the high pressure outlet 14, and an outlet 20 connected to a vessel 22 which is adapted to collect liquid refrigerant. A refrigerant-conducting line 24 connects the vessel 22 to a thermostatic expansion valve 26 through a filter drier 28, a liquid indicator 30 and a solenoid-controlled liquid valve 32. The cooling coil 34 of the system has an inlet 36 connected to the expansion valve 26, and an outlet 38 connected by means of a pipe 41 to a refrigerant inlet 40 of a full flow liquid refrigerant vaporizing accumulator of the invention indicated generally by 42. The vaporizing accumulator 42 replaces the usual accumulator and has an outlet 44 connected to the suction line 46, that in turn is connected to the suction inlet 12 of the compressor 10.

In its usual mode of operation hot compressed gas from the compressor is condensed in coil 16, a fan 48 being provided to circulate air over and through the finned heat exchange structure of the coil. With the valves 26 and 32 open liquid refrigerant expands in the expansion valve 26 and passes into the coil 34 to cool the coil and therefore the adjacent space, air being circulated over the coil by a fan 50. All the expanded refrigerant vapour passes through the vaporizing accumulator 42, whose structure and function will be described in detail below, to return to the compressor 10. This is of course a standard mode of operation for a refrigeration system, and this particular flow is illustrated by the broken line arrows.

Figure 2:
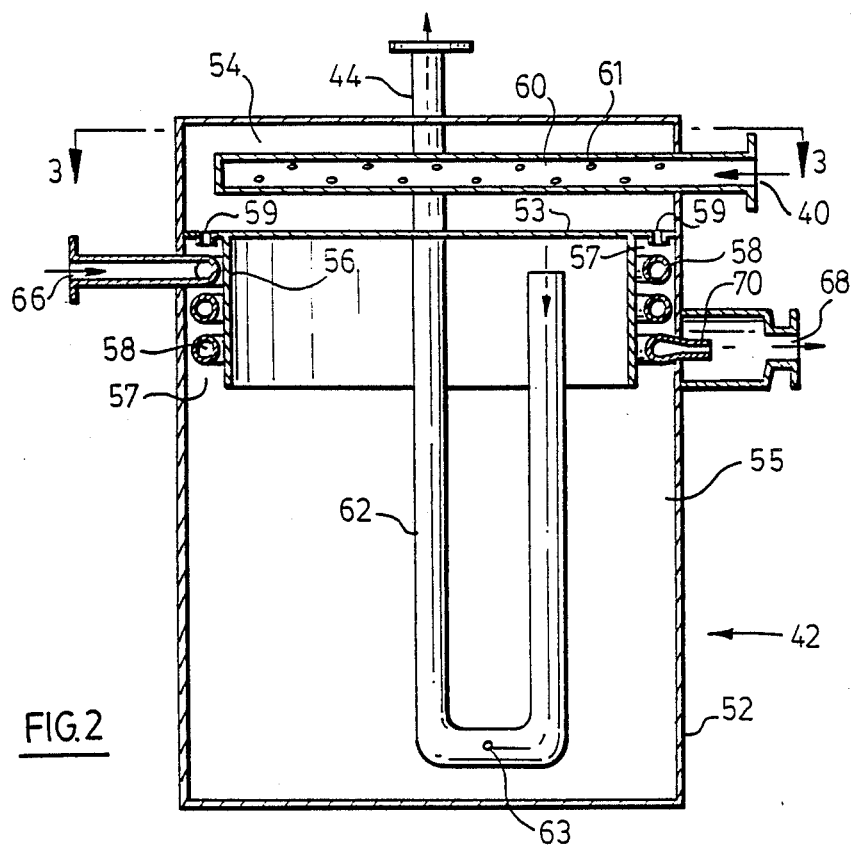
FIG. 2 is a vertical cross-section through a full flow liquid refrigerant vaporizing accumulator of the invention.
Figure 3:
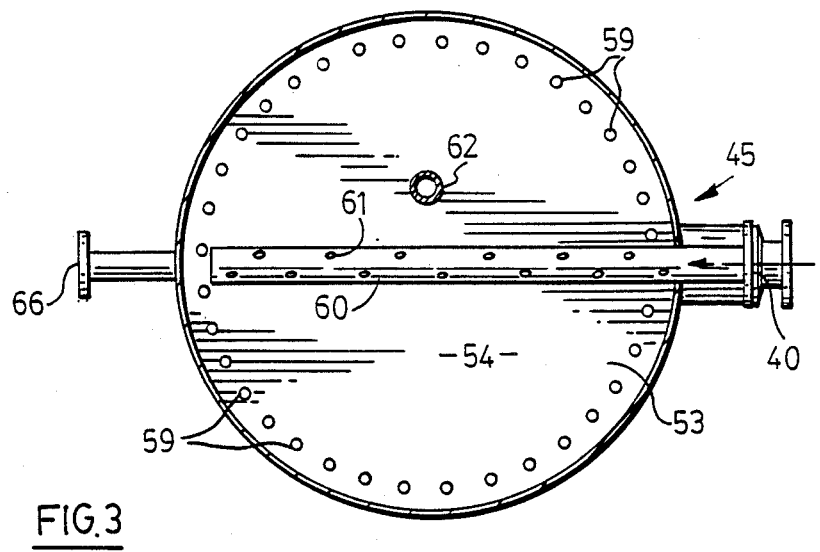
FIG. 3 is a transverse section through the vaporizing accumulator of FIG. 2.

The construction of the liquid refrigerant vaporizing accumulator will now be described with particular reference to FIG. 2 and 3. The device comprises a body member consisting of an outer shell 52, usually of cylindrical form, divided by a transverse plate member 53 into a smaller upper chamber 54 and a larger lower chamber 55. A baffle member 56 extends downward from the underside of the plate 53 into the lower chamber, the member being spaced equidistantly around its circumference from the inner wall of the shell 52 to provide an annular space 57 therebetween, in which is disposed a helical heat-exchange hot gas coil 58 of a suitable heat conductive material, for example copper, brass and the like. The interiors of the two chambers communicate with one another by means of a plurality of bores or holes 59 in the plate member 53 arranged in a circle adjacent its outer circumference, as best seen in FIG. 3, these holes being centered above the hot gas coil 58. The suction inlet 40 is connected to a perforated closed-end pipe 60 mounted in the outer shell 52 and centered in the upper chamber 54. The number and size of the holes 61 in this pipe are chosen to provide a flow cross-sectional area sufficient not to provide any appreciable back pressure in the suction pipe, while distributing the refrigerant throughout the chamber 54 in a turbulent flow that facilitates the vaporization of any liquid refrigerant entrained therein.

The turbulent vapor passes through the holes 59 into relatively contained space 57 where it is forced to impinge on the hot gas heat exchange coil 58, which is heated as described below. The fluid passes into the lower chamber 55, and then passes through a conventional J-shaped accumulator outlet pipe 62 to the outlet 44, the lowest part of the pipe 62 being provided with the usual drain hole 63 to drain oil trapped in the lower chamber 55 by entraining it in the refrigerant flow passing in the J-tube. It will also be noted that the outlet pipe has its inlet from the lower chamber disposed close to the partition 53, well above any liquid level in the chambers, so that normally only fluid vapor can exit therefrom. A hot gas inlet 66 is provided at one end of coil 58 and an outlet 68 at the other end, so that hot refrigerant fluid from the pump outlet 14 can be passed through the coil and heat it as well as the adjacent outer wall of the shell 52. The outlet 68 contains an orifice or restriction 70 of predetermined smaller size whose function will be explained below.

The dimensions of the pipe 60, the apertures 61 and the flow capacity of the coil 58 are important for the successful functioning of the vaporizing accumulator in accordance with the invention. Thus, the pipe 60 preferably is of at least the same internal diameter as the remainder of the suction line to the compressor, so that it is of the same flow cross-sectional area and capacity. The number and size of the holes 61 are chosen so that the flow cross-section area provided by all the holes together is not less than about 0.5 of the cross-section area of the pipe 60 and preferably is about equal or slightly larger than that area. The total cross-section area of the holes need not be greater than about 1.5 times the pipe cross-section area and increasing the ratio beyond this value has no corresponding increased beneficial effect. Moreover, each individual hole should not be too large and if a larger flow area is needed it is preferred to provide this by increasing the number of holes. A specific example will be given below. The purpose of these holes is to direct the flow of refrigerant fluid radially outwards into contact with the inner walls of the upper chamber 54 so as to achieve the desired turbulence, and this purpose may not be fully achieved if the holes are too large. The holes are uniformly distributed along and around the pipe 60 to maximize the area of the walls of chamber 54 that is contacted by the fluid issuing from the holes.

It is also important that the flow cross-section area of all of the holes 59 between the two chambers 54 and 55 be not less than about 0.5 of the corresponding flow area of the pipe 60, and again preferably they are about equal with the possibility of being greater, but not too much greater, the preferred maximum again being about 1.5 times. The inlet 66 to the helical coil 58 and the outlet 68 are of sufficient size not to throttle the flow of fluid therethrough, and when the restriction 70 is a separate unit this will also be true of the outlet 68.

It will be understood by those skilled in the art that if the vaporizing accumulator is constructed in this manner then during normal cooling operation of the system it will appear to the remainder of the system as nothing more than the standard accumulator, which is an intrinsic part of the system, or at most a minor constriction or expansion of insufficient change in flow capacity to change the characteristics of the system significantly. The system can therefore be designed without regard to this particular flow characteristic of the vaporizing portion of the accumulator. Moreover, it will be seen that it can be incorporated by retrofitting into the piping of an existing refrigeration system by simple replacement of the existing accumulator without causing any unacceptable change in the flow characteristics of the system.

A hot gas defrost system of the invention comprises the full flow vaporizing accumulator 42, its inlet 66 being connected to the hot gas outlet 14 of the compressor via a control valve 72 and a hot gas solenoid-operated valve 74, while its outlet 68 is connected via a check valve 75 to the junction of coil inlet 36 and expansion valve 26. The operation of the defrost system is under the control of a defrost timer 76 connected to the fan 50 and the valves 32 and 74. The operation of the expansion valve 26 is under the control of a thermostatic sensor 78. The remainder of the controls that are required for operation of the system will be apparent to those skilled in the art and do not require description herein for understanding of the present invention.

At predetermined intervals the defrost timer 76 initiates a defrost cycle by closing the solenoid valve 32 so that expanded cold refrigerant is no longer supplied to the coil 34. The fan 50 continues to operate, causing any remaining liquid refrigerant in coil 34 to boil off and pass through the accumulator to the compressor 10. After a period sufficient to ensure that all of the liquid refrigerant has been evaporated the timer deenergizes the fan 50 and opens hot gas solenoid valve 74, whereupon heated high pressure vapour from the compressor flows through the coil 64 of the vaporizing accumulator and heats it. The fluid exits at outlet 68 through the restriction 70 and passes the check valve 75 to enter the coil 34. The fluid gives up sensible and latent heat to the coil 34, warming it and melting any frost and ice accumulation, the gas becoming cooler by the consequent heat exchange. The fluid moves through the coil at relatively high velocity and only part of it condenses to liquid.

The high velocity fluid from coil 34 with its entrained liquid enters the pipe 60 of the vaporizing accumulator and, because of the dead end at the end of the pipe and the abrupt change of direction imposed upon it, becomes severely turbulent, far more so than the low velocity gas involved in the normal refrigeration cycle as described above. The resulting turbulent mist is discharged forcefully through the holes 61 into intimate contact with the walls of the chamber 54 and then equally forcefully through the holes 59 into intimate contact with the hot wall of the pipe 58, resulting in complete and substantially immediate evaporation of the fine droplets. The fluid in the chamber 56, consisting now entirely of vapour, exits through outlet 44 to the compressor inlet 12. It may be noted that in prior art systems the accumulator is not required for the hot gas defrost cycle and its sole purpose has been to try to protect the compressor in case of a liquid refrigerant flow control malfunction. As is usual, any lubricant in the system that collects in the accumulator bleeds back into the circuit through drain hole 63 in the pipe. At the end of the timed defrost period the timer 76 deenergizes and closes the hot gas valve 74, opens valve 32 and reenergizes the fan motor 50, so that the system is again in its normal cooling mode.

The orifice or flow restrictor 70 is surprisingly effective in providing consistent defrosting and self-regulation of the process, the latter avoiding compressor overload and consequent stress. The orifice can of course be a controllable valve and may be separate from the vaporizing accumulator when retrofitted into a system to provide for suitable adjustment, while for a predesigned and prebuilt system it will usually be a fixed orifice. One effect of the restriction is that the discharge pressure of the compressor is increased, resulting in a higher temperature and greater density of the fluid fed to the coil 64, and consequently resulting in a fluid of higher energy content that ensures adequate heating of the wall of the pipe despite the speed at which the gas flows through the coil.

Another effect is to produce a predetermined pressure drop in the saturated hot, high pressure refrigerant fluid flowing through it. This pressure drop causes the liquid in the fluid to vaporize using up part of its sensible heat, at the same time increasing its volume and therefore its velocity through the check valve 75 and into the coil 34. It will be noted that the velocity of the hot gas is not diminished by the vaporizing accumulator 42 because of its full flow characteristic backed by the full suction that can be maintained by the compressor. This high speed flow through the coil 34 ensures that at all times, even at the start of the defrost cycle when the coil is particularly cold, there will only be partial condensation of the refrigerant to liquid, and forceful passage of the resultant mist through the vaporizing accumulator, and particularly through the apertures 61 and 59 to ensure its impact against the hot wall of the tube 58. The high velocity also ensures that the gas passing from inlet 40 to outlet 46 receives enough heat to fully vaporize any droplets, but does not pick up so much heat from the counterflowing hot gas in the coil 64 that the compressor becomes overheated. Thus, the vaporizing accumulator 42 is very efficient in its vaporizing function, but is a very inefficient counterflow heat exchanger due to its design.

It is important to ensure the re-evaporation of any liquid component in the hot gas fluid, and also to maintain the velocity of the gaseous fluid passing in the circuit as high as possible, especially that of the gaseous fluid passing through the coil 34, so as to maximise the efficiency of the defrost action. Thus, if the velocity through the coil 34 is not maintained at a sufficient level there is a greater tendency for the refrigerant to liquify. This maintenance of the velocity is particularly difficult in close coupled systems, and those with hot gas lines of relatively small bore, and is facilitated by the expansion chamber 71, which provides an enlarged space immediately following the restrictor in which any residual liquid can expand to the vapor state.

The restrictor 70 also renders the system surprisingly self-regulating. During the initial part of the defrost cycle the coil 34 is very cold with frost and ice on its outer surfaces. A greater proportion of the hot defrosting refrigerant passing through the coil 34 condenses to produce a saturated mixture of vapour and droplets. When this saturated mixture goes through the vaporizing accumulator and the liquid component is vaporized an almost equal amount of hot vapour in the coil 64 is condensed, so that the hot refrigerant fluid passing through the orifice 70 is more dense and saturated and a greater weight can pass through to the compressor inlet to result in a higher head pressure during this initial operation. As the coil 34 is warmed less vapour will condense in it, resulting in less vapour condensing in the coil 64 and a resultant lower density mixture of vapour and liquid passing through the restriction 70. This lower density mixture moves at a slower rate, as measured by weight, through the orifice than the initial high density mixture, so that as the coil becomes cleared of frost less passes through and consequently the suction supply pressure to the compressor decreases, decreasing the compressor head pressure and also decreasing the power required to drive the compressor motor. Moreover, as the defrost period progresses the temperature of the fluid entering the coil 34 increases, which helps to ensure that liquid does not condense in it.

In the absence of the restriction the vaporizing accumulator will still function, but as the coil 34 becomes warmer, because the inlet temperature of the fluid to the coil will remain low and not increase, the time taken for defrost will considerably increase. Moreover, the vaporizing accumulator may now become too effective causing a steady increase in the suction pressure, and causing the compressor motor to eventually draw excessive current.

It will be noted that the specific embodiment described employs a single evaporator coil, but there is no difficulty in the system running out of heat or vapour, so that the compressor becomes starved of vapour to its inlet and cannot work efficiently, since the vaporizing accumulator ensures that all of the refrigerant fluid is delivered to the compressor in vapour form. In the absence of the vaporizing accumulator the liquid in the fluid would be extracted by the conventional accumulator and will return too slowly to the circuit as vapour. Since the compressor is always fully supplied with vapour it operates at high efficiency in compressing and heating the vapour and thus converting electrical energy, appearing as the kinetic energy of the motor, into heat energy for the defrost, and this high efficiency will be maintained even when the coil is heavily iced and consequently causing condensation of a substantial quantity of liquid. It is for this reason also that as the defrost proceeds and the quantity of liquid decreases it will be found that the temperature of the hot gas increases. This effect combined with the inherent high efficiency of a hot gas defrost system in delivering the defrost heat directly into the coil will result in a system of overall high efficiency.

It is found with the invention that there is no longer any need in a multiple coil system to defrost only one coil at a time, and instead a number of coils can be defrosted simultaneously and in parallel, all of the coils discharging their cooled fluid to a single vaporizing accumulator. It will be understood that in a commercial installation employing a large number of coils, it may be preferred to group them in sets, each set being connected to a respective device.

The orifice 70 will usually be arranged to provide an increase in back pressure of about 50%. It will be understood by those skilled in the art that there is not necessarily a direct relationship between the reduction in flow cross-section and the pressure drop caused by an orifice, since this will also depend upon other characteristics of the restriction, such as its length. In the application of this invention a suitable range of back pressure increase for the orifice 70 is from 20% to 70%, while the preferred range is from 40% to 60%.

In a specific embodiment intended for employment in a commercial refrigeration system of 5 H.P. capacity, the body of the vaporizer accumulator is cylindrical having a height of about 37.5 cms (15 ins) and an external diameter of about 17.5 cms (7 ins). The device is installed with the longitudinal axis of the body vertical in order to be able to perform its accumulator function. The first upper chamber 54 has a height of about 10.0 cms (4.0 ins), the height of the second lower chamber therefore being about 27.5 cms (11.0 ins). Both the pipe 60 and the accumulator outlet pipe 62 are of 2.8 cms (1.125 ins) outside diameter copper tube, the pipe 60 being provided with 36 holes 61, each of 0.47 cms (0.19 ins) diameter distributed uniformly along its length and around its circumference. The coil 58 consists of 2.5 turns of copper pipe of 1.56 cms (0.625 ins) outside diameter, while the partition is provided with 32 holes 59, each of 0.47 cms (0.19 ins) diameter, distributed uniformly in a circle around the peripheral portion thereof.

Figure 4:
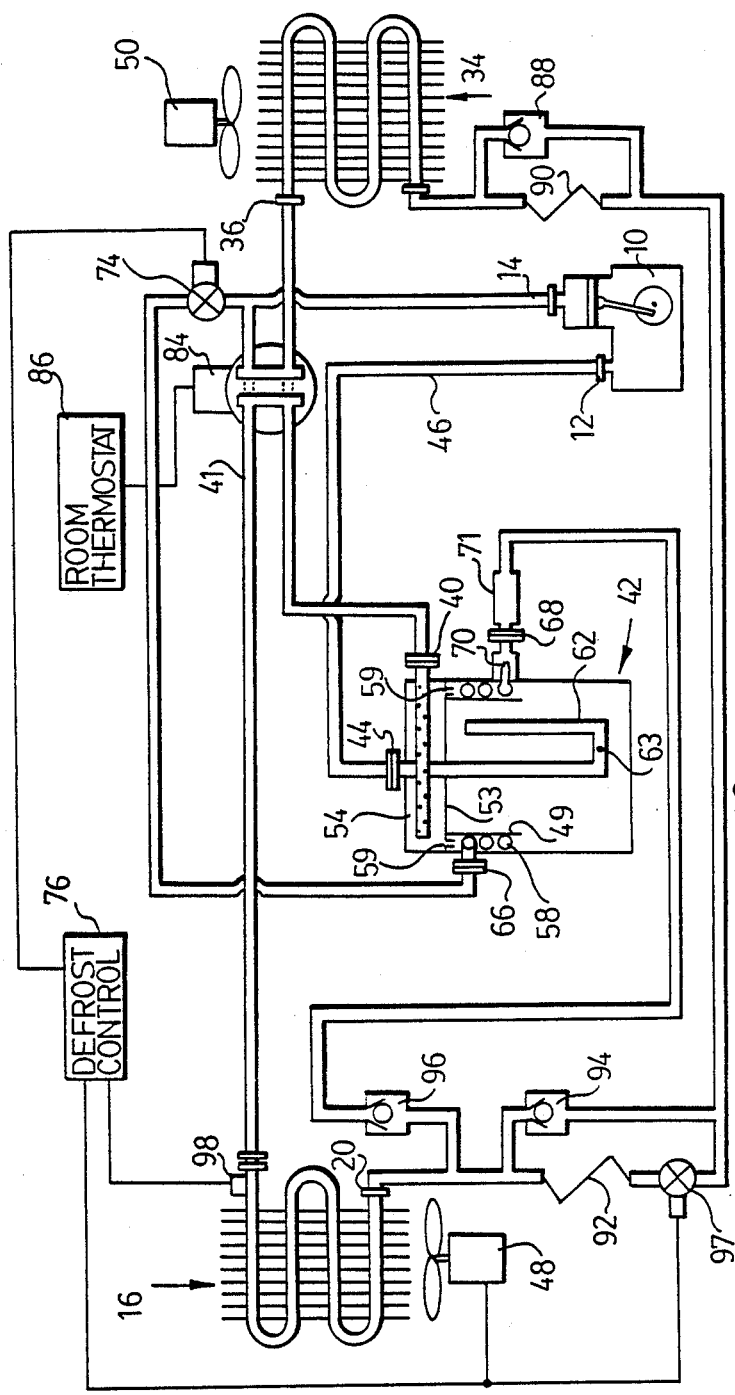
FIG. 4 is a schematic diagram of a heat pump system embodying the invention.

The invention is of course also applicable to domestic refrigerators which hitherto have normally used electric defrost circuits, but would be much more energy efficient if hot gas defrost could be used. The invention is also particularly applicable to heat pump systems and FIG. 4 shows such a system in heating mode, the system being shifted to air conditioning mode by movement of a solenoid-operated valve 84 from the configuration shown in solid lines to that shown in broken lines. Coil 16 is the outdoor coil which in heating mode is cooled and in air conditioning mode is heated, while coil 34 is the inside coil with which the reverse occurs. When the outside temperature falls below about 8° C (45° F) the temperature of coil 16 in heating mode will be cold enough to condense and freeze moisture in the air circulated over it by fan 48, and if this frost is allowed to build up will quickly reduce the unit's efficiency. The most common method of defrosting is simply to reverse the cycle to air conditioning mode by operation for a period of from 2 to 10 minutes of change-over valve 84, every 30 to 90 minutes, depending upon the severity of the icing conditions. This valve is normally under the control of room thermostat 86 which causes it to switch from one mode to the other for heating or cooling as required. This system conceptually is simple but has a number of practical disadvantages and problems.

For example, the hot high pressure refrigerant that has been fed by the compressor to the indoor coil 34 acting as a condenser is now suddenly dumped into the accumulator and then to the compressor inlet 12; with prior art accumulators there is then a danger of more liquid than can be removed by the accumulator being fed to the compressor causing wear and strain of this expensive component, and shortening its useful life. Again, because the unit is now in air conditioning mode the inside coil 34 is quickly chilled, causing an unpleasant chill to the living area; this is usually compensated by arranging to by-pass the room thermostat and bring auxiliary gas or electric heaters into operation, but this involves additional expense and energy consumption. This practice also does have a danger that the entire system may be locked in the heating condition when the heat pump returns to heating mode with the possibility of overheating and fire; for this reason there is a move by some licensing authorities to ban the practice. The valve 84 is a large, expensive component owing to the high temperatures and fluid pressures involved, and the constant frequent switching required for the defrost cycle considerably reduces its useful life. All of these disadvantages can be avoided by use of a hot gas defrost using the full flow vaporizing accumulator device of the invention.

Thus, in heating mode the hot high pressure vapour produced by the compressor 10 is fed via the valve 84 to the indoor coil 34 while hot gas solenoid valve 74 is closed. The vapour condenses in the coil to heat the air passed over the coil by the fan 50, and the condensed refrigerant passes through check valve 88, by-passing expansion device 90 which is illustrated as being a capillary line, but instead can be an orifice or expansion valve of any known kind. The liquid however must pass through similar expansion device 92 via open solenoid valve 97 and the resultant expanded cooled vapour passes to the outdoor coil 16 to be heated and vaporized by the ambient air. Check valves 94 and 96 ensure respectively that the device 92 is not by-passed, and that the expanded vapour cannot enter the vaporizing accumulator 42. The vaporized refrigerant from the coil 16 passes through the valve 84 and then through the accumulator device 42 as it would through the conventional prior art accumulator then passing to the compressor inlet 12 to complete the cycle. The controls required for the operation of the system will be apparent to those skilled in the art and a description thereof is not needed herein for a full explanation of the present invention.

A defrost cycle is initiated by the defrost control 76 without any change required in the position of valve 84, the control switching off the fan motor 48, so that the coil 16 is no longer cooled by the fan, and opening the hot gas valve 74 to admit the hot high pressure refrigerant vapour from the compressor to the coil 58, as well as to the indoor coil 34. The liquid line solenoid valve 97 installed ahead of the expansion device 92 is closed during the defrost period to prevent the liquid refrigerant in the line expanding into the outside coil 16, which would reduce the defrost efficiency. After warming the pipe 58 the hot gas passes through restrictor orifice 70 and check valve 96 to enter the coil 16 and perform its defrost function, as described above with reference to FIG. 1. The direct pressure of the hot gas at the end of the restrictor 92 blocks the flow from the coil 34 so that the refrigerant is trapped in the line between the two restrictions. The operation of the device 42 and the orifice 70 is exactly as described above, the gas from the outlet 44 passing through valve 84 to the suction inlet 12 of the compressor. After a predetermined period of time set by the defrost control 76, with or without an override temperature control provided by a thermostat 98 adjacent to the coil outlet 18, whichever arrangement is preferred to ensure that defrosting is complete, the valve 74 is closed to stop the direct flow of hot gas to the vaporizing accumulator 42 and coil 16 solenoid valve 97 is opened, and the fan motor 48 is restarted. The system then returns to its normal heating cycle, again without shift of the valve 84, and without the many disadvantages described above.

Although in both the embodiments described herein the orifice or restriction 70 is illustrated as attached directly to the body of the vaporizing accumulator 42, this is not essential and it will function equally effectively as a separate item. As before, it also operates with the vaporizing accumulator to provide automatic limiting and self-regulation. A greater weight of refrigerant can flow per unit time through a fixed restriction when in liquid form rather than in vapour form, and the amount of heat transfer depends upon the weight of refrigerant pumped per minute, and not the volume, which is constant. At the beginning of the defrost period there is little condensation in chamber 64 and so little liquid to pass through the restriction; initially therefore there is a lower gas velocity through the outdoor coil, which is desirable since the coil is relatively full of liquid refrigerant and too high a pressure and gas velocity would discharge this liquid too quickly and may overload the vaporizing accumulator despite its very high evaporation capability. However, the accumulator portion of the device is available in case this does happen and is operative to prevent the initial spurt of liquid from reaching the compressor and damaging it.

As this initial flow of liquid vaporizes in chamber 54 it causes condensation of substantially an equal amount of liquid in coil 58, so that a greater weight of refrigerant passes through the restriction 70. Once past the restriction this additional liquid vaporizes due to pressure reduction, increasing the gas velocity through the coil 16 to ensure that only a portion of this vapour condenses therein as the result of the defrosting. As the coil is cleared of frost and becomes warmer a smaller quantity of the hot defrosting gas condenses, so that less condenses in therefore less passes through the restriction and there is less evaporation beyond the restriction, resulting in the above-described beneficial supply of cooler gas at lower suction pressure to the compressor. It will be seen that the poor heat exchange characteristic of the vaporizing accumulator is desirable, since an efficient exchanger would result in delivery of hotter gas to the compressor with increased possibility of overheating and damage thereto.

The vaporizing accumulator is inoperative as a vaporizer, but is still operative as an accumulator when the system is in air conditioning or cooling mode, and accordingly description of the cycle in that mode is not required, except to point out that the expansion device 90 is now operative while the device 92 is by-passed by check valve 94.

It will be seen that with the hot gas defrost systems of the invention the energy required for defrost is supplied by the compressor motor to the refrigerant as sensible heat, and from the refrigerant directly to the pipe or pipes of the coil and outwardly therefrom to the fins which are in intimate heat exchange contact with the pipe. This effectively provides the defrosting heat at the precise same location in the coil as heat is withdrawn during cooling and maximum defrosting efficiency is thereby obtained, with the full flow vaporizing accumulator providing a constant supply of cool refrigerant vapour to the compressor to be compressed and heated as long as it is required.

I claim:

1. A liquid refrigerant vaporising accumulator for use in a refrigeration system employing a compressor and hot refrigerant fluid from the compressor to defrost a coil or coils thereof, the vaporizing accumulator comprising:

a body member;

a partition member within the interior of the body member and dividing the interior into first and second chambers;

an inlet to the first chamber for connection into the refrigeration system so as to receive the refrigerant fluid exiting from the coil under defrost and to produce turbulence therein as it enters the first chamber;

a plurality of bores in the partition connecting the interiors of the two chambers, constituting the only outlet for all of the refrigerant fluid from the first chamber, and for the passage of the turbulent refrigerant fluid from the first chamber to the second chamber;

a heat exchange pipe of heat conductive material disposed in the second chamber adjacent the said plurality of bores for its surface to be impinged by the turbulent refrigerant fluid passing through the bores for vaporization of any liquid refrigerant entrained therein;

an inlet to the heat exchange pipe and an outlet therefrom for connection into the refrigeration system to receive and to deliver respectively hot refrigerant fluid received from the compressor; and an outlet from the second chamber for all of the refrigerant fluid into an accumulator outlet pipe within the second chamber.

2. A vaporizing accumulator as claimed in claim 1, wherein the body member is cylindrical and in operation is disposed with its longitudinal axis vertical;

the partition member is a transverse circular partition dividing the interior of the body member into a first upper chamber and a second lower chamber;

the plurality of bores is disposed in the partition circumferentially thereof to be close to the inner wall of the body member; and the heat exchange pipe has the form of a helical coil mounted in the second chamber adjacent its inner wall immediately beneath the bores to be impinged by refrigerant fluid passing therethrough.

3. A vaporizing accumulator as claimed in claim 2, and including a cylindrical baffle of smaller diameter than the body member, disposed within the second chamber to form between itself and the inner wall of the body member an annular space receiving the heat exchange pipe helical coil and confining the flow of the refrigerant fluid onto the coil.

4. A vaporizing accumulator as claimed in claim 1, wherein the inlet to the first chamber producing said turbulence of the entering refrigerant fluid comprises an inlet pipe extending across the chamber, the wall of the inlet pipe being provided with a plurality of bores directing the refrigerant fluid passing therein radially outwards therefrom to impinge against the adjacent chamber walls and thereby become turbulent before its passage through the bores in the partition member.

5. A vaporizing accumulator as claimed in claim 1, wherein the accumulator outlet pipe is of J-shape with its inlet to the second chamber close to the partition member to be above the level of any liquid in the second chamber.

6. A vaporizing accumulator as claimed in claim 1, wherein the total flow area provided by all of the bores in the partition is not more than 1.5 times the cross-sectional flow area of the inlet to the first chamber.

7. A vaporizing accumulator as claimed in claim 6, wherein the total flow area provided by all of the said bores is between 0.9 and 1.2 times the cross-sectional flow area.

8. A vaporizing accumulator as claimed in claim 1 and including a refrigerant fluid flow restriction at or connected to the heat exchange pipe outlet for producing an increase in back pressure of the refrigerant fluid in the pipe.

9. A vaporizing accumulator as claimed in claim 8, wherein the increase in back pressure produced by the fluid flow restriction is between 20% and 70% of the pressure in the absence of the fluid flow restriction.

10. A vaporizing accumulator as claimed in claim 9, wherein the increase in back pressure produced by the fluid flow restriction is between 40% and 60% of the pressure in the absence of the fluid flow restriction.

11. A vaporizing accumulator as claimed in claim 8, wherein the fluid flow restrictor is directly attached to the pipe outlet.

12. A vaporizing accumulator as claimed in claim 1, wherein the said bores in the partition are of flow area from 8 to 18 sq.mm (0.012 to 0.028 sq.in) and the total flow area of all of the bores is adjusted by adjustment of the number of bores.

13. A vaporizing accumulator as claimed in claim 8, wherein a portion of pipe of increased flow capacity is provided downstream of the fluid flow restriction to provide for re-evaporation of any liquid in the hot gas passing through the restriction.

14. A hot refrigerant fluid defrost system for use in a refrigeration system for defrost of a coil or coils thereof, the system comprising:
 a controllable flow valve adapted for connection to the outlet of a compressor pump to receive hot compressed refrigerant fluid therefrom;
 a coil to be defrosted having an inlet and an outlet; and
 a vaporizing accumulator connected to the coil for vaporizing liquid fluid issuing from the coil outlet to prevent its delivery to the compressor inlet, the vaporizing accumulator comprising:
 a body member;
 a partition member within the interior of the body member and dividing the interior into first and second chambers;
 an inlet to the first chamber for connection into the refrigeration system so as to receive the refrigerant fluid exiting from the coil under defrost and to produce turbulence therein as it enters the first chamber;
 a plurality of bores in the partition connecting the interiors of the two chambers, constituting the only outlet for all of the refrigerant fluid from the first chamber, and for the passage of the turbulent refrigerant fluid from the first chamber to the second chamber;
 a heat exchange pipe of heat conductive material disposed in the second chamber adjacent the said plurality of bores for its surface to be impinged by the turbulent refrigerant fluid passing through the bores for vaporization of any liquid refrigerant entrained therein;
 an inlet to the heat exchange pipe and an outlet therefrom for connection into the refrigeration system to receive and to deliver respectively hot refrigerant fluid received from the compressor; and
 an outlet from the second chamber for all of the refrigerant fluid into an accumulator outlet pipe within the second chamber.

15. A system as claimed in claim 14, wherein the body member is cylindrical and in operation is disposed with its longitudinal axis vertical;
 the partition member is a transverse circular partition dividing the interior of the body member into a first upper chamber and a second lower chamber;
 the plurality of bores is disposed in the partition circumferentially thereof to be close to the inner wall of the body member; and
 the heat exchange pipe has the form of a helical coil mounted in the second chamber adjacent its inner wall immediately beneath the bores to be impinged by refrigerant fluid passing therethrough.

16. A system as claimed in claim 15, and including a cylindrical baffle of smaller diameter than the body member, disposed within the second chamber to form between itself and the inner wall of the body member an annular space receiving the heat exchange pipe helical coil and confining the flow of the refrigerant fluid onto the coil.

17. A system as claimed in claim 14, wherein the inlet to the first chamber producing said turbulence of the entering refrigerant comprises an inlet pipe extending across the chamber, the wall of the inlet pipe being provided with a plurality of bores directing the refrigerant fluid passing therein radially outwards therefrom to impinge against the adjacent chamber walls and thereby become turbulent before its passage through the bores in the partition member.

18. A system as claimed in claim 14, wherein the accumulator outlet pipe is of J-shape with its inlet to the second chamber close to the partition member to be above the level of any liquid in the second chamber.

19. A system as claimed in claim 14, wherein the total flow area provided by all of the bores in the partition is not more than 1.5 times the cross-sectional flow area of the inlet to the first chamber.

20. A system as claimed in claim 19, wherein the total flow area provided by all of the said bores is between 0.9 and 1.2 times the cross-sectional flow area.

21. A system as claimed in claim 14, and including a refrigerant fluid flow restriction at or connected to the heat exchange pipe outlet for producing an increase in back pressure of the refrigerant fluid in the pipe.

22. A system as claimed in claim 21, wherein the increase in back pressure produced by the fluid flow restriction is between 20% and 70% of the pressure in the absence of the fluid flow restriction.

23. A system as claimed in claim 22, wherein the increase in back pressure produced by the fluid flow restriction is between 40% and 60% of the pressure in the absence of the fluid flow restriction.

24. A system as claimed in claim 22, wherein the fluid flow restrictor is directly attached to the pipe outlet.

25. A system as claimed in claim 14, wherein the said bores in the partition are of flow area from 8 to 18 sq.mm (0.012 to 0.028 sq.in.) and the total flow area of all of the bores is adjusted by adjustment of the number of bores.

26. A system as claimed in claim 22, wherein a portion of pipe of increased flow capacity is provided downstream of the fluid flow restriction to provide for re-evaporation of any liquid in the hot gas passing through the restriction.

27. A system as claimed in claim 14, wherein the refrigeration system is incorporated in a heat pump.

28. A system as claimed in claim 14, and comprising a plurality of coils to be defrosted, wherein there is provided a single vaporizing accumulator connected to all of the coil outlets to receive refrigerant therefrom.

29. A refrigeration system comprising:
a refrigerant compressor;
a cooling coil having an inlet and an outlet;
an expansion device for expanding and cooling refrigerant connected between the compressor and the cooling coil inlet;
a controllable defrost control valve connected to the compressor outlet to receive hot compressed refrigerant fluid therefrom;
and a liquid refrigerant vaporizing accumulator connected to the coil for vaporizing liquid fluid issuing from the coil outlet to prevent its delivery to the compressor inlet, the vaporizing accumulator comprising:
a body member,
a partition member within the interior of the body member and dividing the interior into first and second chambers;
an inlet to the first chamber for connection into the refrigeration system so as to receive the refrigerant fluid exiting from the coil under defrost and to produce turbulence therein as it enters the first chamber;
a plurality of bores in the partition connecting the interiors of the two chambers, constituting the only outlet for all of the refrigerant fluid rom the first chamber, and for the passage of the turbulent refrigerant fluid from the first chamber to the second chamber;
a heat exchange pipe of heat conductive material disposed in the second chamber adjacent the said plurality of bores for its surface to be impinged by the turbulent refrigerant fluid passing through the bores for vaporization of any liquid refrigerant entrained therein;
an inlet to the heat exchange pipe and an outlet therefrom for connection into the refrigeration system to receive and to deliver respectively hot refrigerant fluid received from the compressor; and
an outlet from the second chamber for all of the refrigerant fluid into an accumulator outlet pipe within the second chamber.

30. A system as claimed in claim 29, wherein the body member is cylindrical and in operation is disposed with its longitudinal axis vertical;

the partition member is a transverse circular partition dividing the interior of the body member into a first upper chamber and a second lower chamber;
the plurality of bores is disposed in the partition circumferentially thereof to be close to the inner wall of the body member; and
the heat exchange pipe has the form of a helical coil mounted in the second chamber adjacent its inner wall immediately beneath the bores to be impinged by refrigerant fluid passing therethrough.

31. A system as claimed in claim 30, and including a cylindrical baffle of smaller diameter than the body member, disposed within the second chamber to form between itself and the inner wall of the body member an annular space receiving the heat exchange pipe helical coil and confining the flow of the refrigerant fluid onto the coil.

32. A system as claimed in claim 29, wherein the inlet to the first chamber producing said turbulence of the entering refrigerant fluid comprises an inlet pipe extending across the chamber, the wall of the inlet pipe being provided with a plurality of bores directing the refrigerant fluid passing therein radially outwards therefrom to impinge against the adjacent chamber walls and thereby become turbulent before its passage through the bores in the partition member.

33. A system as claimed in the accumulator outlet pipe is of J-shape with its inlet to the second chamber close to the partition member to be above the level of any liquid in the second chamber.

34. A system as claimed in claim 29, wherein the total flow area provided by all of the bores in the partition is not more than 1.5 times the cross-sectional flow area of the inlet to the first chamber.

35. A system as claimed in claim 34, wherein the total flow area provided by all of the said bores is between 0.9 and 1.2 times the cross-sectional flow area.

36. A system as claimed in claim 29, and including a refrigerant fluid flow restriction at or connected to the heat exchange pipe outlet for producing an increase in back pressure of the refrigerant fluid in the pipe.

37. A system as claimed in claim 36, wherein the increase in back pressure produced by the fluid flow restriction is between 20% and 70% of the pressure in the absence of the fluid flow restriction.

38. A system as claimed in claim 37, wherein the increase in back pressure produced by the fluid flow restriction is between 40% and 60% of the pressure in the absence of the fluid flow restriction.

39. A system as claimed in claim 37, wherein the fluid flow restrictor is directly attached to the pipe outlet.

40. A system as claimed in claim 29, wherein the said bores in the partition are of flow area from 8 to 18 sq.mm (0.012 to 0.028 sq.in.) and the total flow area of all of the bores adjusted by adjustment of the number of bores.

41. A system as claimed in claim 37, wherein a portion of pipe of increased flow capacity is provided downstream of the fluid flow restriction to provide for re-evaporation of any liquid in the hot gas passing through the restriction.

42. A system as claimed in claim 29, wherein the refrigeration system is incorporated in a heat pump.

43. A system as claimed in claim 29, and comprising a plurality of coils to be defrosted, wherein there is provided a single vaporizing accumulator connected to all of the coil outlets to receive refrigerant therefrom.

* * * * *